United States Patent [19]
Eryilmaz

[11] Patent Number: 5,867,574
[45] Date of Patent: Feb. 2, 1999

[54] VOICE ACTIVITY DETECTION SYSTEM AND METHOD

[75] Inventor: Erol Eryilmaz, Middletown, N.J.

[73] Assignee: Lucent Technologies Inc., Murray Hill, N.J.

[21] Appl. No.: 858,421

[22] Filed: May 19, 1997

[51] Int. Cl.[6] ............................................. H04M 1/00
[52] U.S. Cl. ..................... 379/389; 379/390; 455/79; 704/214
[58] Field of Search ................................ 379/388, 389; 381/110; 704/214, 215, 224, 225; 455/78, 79

[56] References Cited

U.S. PATENT DOCUMENTS

| | | | |
|---|---|---|---|
| 4,879,745 | 11/1989 | Arbel ........................................ | 379/389 |
| 5,007,046 | 4/1991 | Erving et al. ........................... | 370/32.1 |
| 5,357,567 | 10/1994 | Barron et al. ........................... | 379/390 |
| 5,598,466 | 1/1997 | Graumann ................................ | 379/389 |
| 5,737,695 | 4/1998 | Lagerqvist et al. ..................... | 455/79 |

*Primary Examiner*—Fan S. Tsang
*Assistant Examiner*—Shih-Wen Hsieh

[57] ABSTRACT

An improved voice activity detection system and method is provided for use in speakerphones and other voice activated systems. To facilitate switching between various operating modes, the voice activity detection scheme utilizes a new voice energy term which is based on an integral of the absolute value of a derivative of a speech signal. Voice activity is detected during a silence mode by comparing a first ratio of a current voice energy value to a background noise value with a voice activity threshold value. Voice activity is detected when the first ratio is greater than the voice activity threshold value. Another step involves identifying a direction of the voice activity during a transmit and receive mode by comparing a second ratio of a transmit path voice energy value to a receive path voice energy value with a transmit threshold value and a receive threshold value. When the second ratio is greater than the transmit threshold value, voice activity is present in the transmit path. Similarly, when the second ratio is less than the receive threshold value, then voice activity is present in the receive path. Following the detection of voice activity in one of the paths, the speakerphone or voice activated system begins transitioning to the applicable mode by gradually suppressing the signal in the other path according to the value of the second ratio.

23 Claims, 4 Drawing Sheets

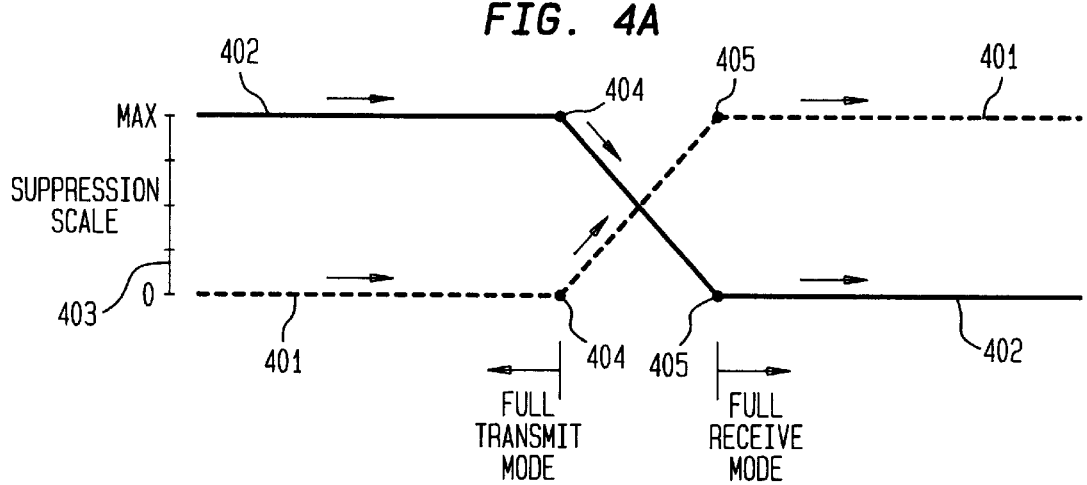
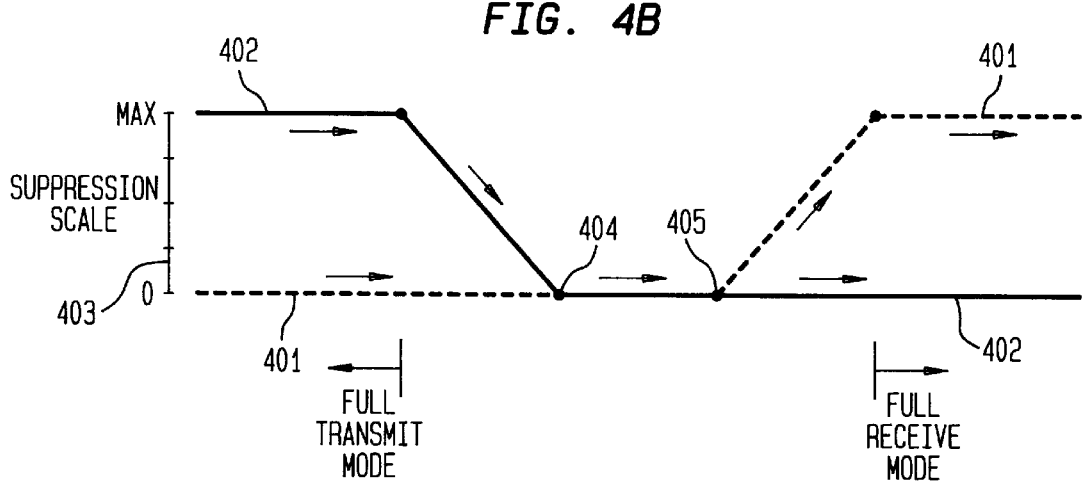
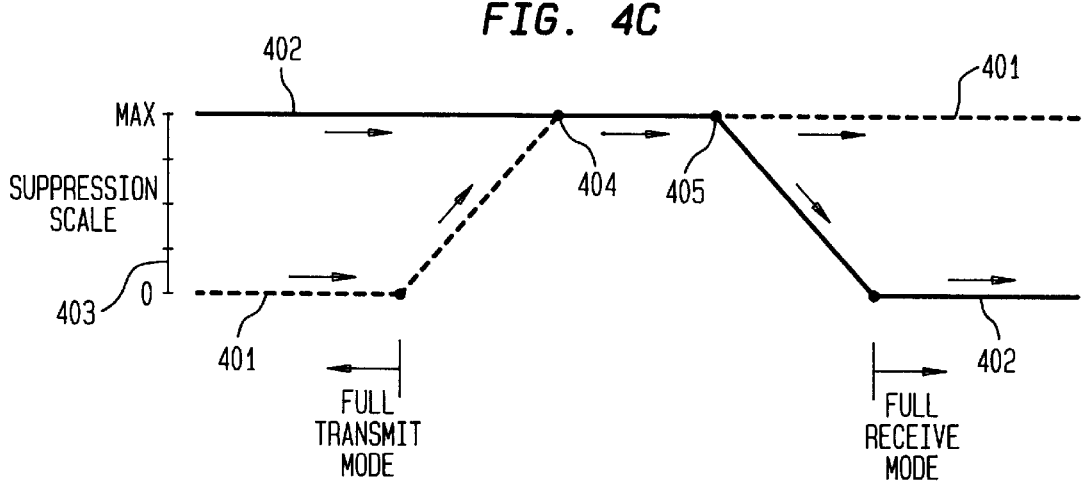

VOICE ACTIVITY DETECTION SYSTEM AND METHOD

FIELD OF THE INVENTION

This invention relates generally to the field of voice activated systems, and more particularly, to an improved voice activity detection scheme for speakerphones, and the like.

BACKGROUND OF THE INVENTION

As is generally known in the art, speakerphones are used to provide "hands-free" operation of telephone sets. A typical speakerphone includes a microphone coupled to an input of a transmit path and a speaker coupled to an output of a receive path. In half-duplex speakerphones, only one of the paths is active while the other is disabled or suppressed. Accordingly, most half-duplex speakerphones have three modes of operation, including a silence mode, a transmit mode, and a receive mode.

Prior art speakerphones generally rely on algorithms implemented in a voice activity detector (VAD) to determine the presence of speech and the direction of speech so that appropriate switching decisions can be made with respect to the various modes of operation. To facilitate the detection of speech, voice energy measurements of speech signals are provided as input to the algorithms. As is known to those skilled in the art, voice energy measurements typically involve summation and multiplication operations using the root means square (rms) voltage levels of the speech signals. Consequently, prior art techniques for sampling and converting amplitudes of voltage levels of the speech signals into voice energy measurements can be processor intensive. As such, prior art systems suffer the disadvantage of using valuable processing time for the measurement of voice energy in a system.

The direction of speech is also identified in a speakerphone so that appropriate switching decisions can be made between the various modes of operation. Speakerphones typically use algorithms to identify the direction having the highest voice energy level. The direction having the highest voice energy level would then be given a clear talking path while the signals in the opposite direction would be suppressed, such as by attenuating the signal by inserting loss into the path. If voice energy is not detected in either path, most speakerphones enter the silence mode. In the course of identifying and adapting to the direction of speech, speakerphones typically experience a clipping problem that normally occurs as a result of switching delays associated with transitions between the various modes of operation.

Acoustical feedback is also a known problem in speakerphone applications as a result of, among other factors, the proximity of the speaker to the microphone. For a typical speakerphone in the prior art, acoustic coupling occurs when signals from the receive path are coupled from the speaker to the transmit path via the microphone. The adverse effects of acoustical feedback can be manifested in the form of "singing" or "ringing." Signals from the transmit path can also be undesirably coupled to the receive path as a result of sidetones that occur at the hybrid interface of the speakerphone and a telephone line. As a result of acoustic coupling and sidetones, the effects of acoustical feedback may be present during any of the various modes of operation. For example, in the silence mode, background noise can be acoustically coupled from the receive path to the transmit path. To counter the effects of acoustic coupling, signals in both the transmit and receive paths are usually suppressed at some level during the silence mode. In the transmit and receive modes, a typical half-duplex speakerphone completely suppresses the inactive path (e.g., the transmit path in the receive mode) to guard against the acoustic coupling effects.

However, in all of the operating modes, the suppression method itself contributes to the clipping problem during the transitions between the various modes. More specifically, the delays associated with the application and removal of suppression of the signals from the transmit and receive paths result in clipping the initial portion of the speech signal during the transition between modes. Consequently, prior art speakerphones suffer the disadvantage of not being able to rapidly switch between modes without clipping some portion of the signal.

Another problem in typical speakerphones is directional loss that occurs when the speaking party is not speaking directly into the microphone. Directional loss affects intelligibility of speech signals and, as a result, causes problems in detecting speech. Directional loss is more problematic at the higher frequencies, because higher frequency speech sounds (e.g., consonants) are more directional and thus more susceptible to directional loss.

Accordingly, there is a need for an improved speakerphone that efficiently utilizes processing resources to overcome the shortcomings of the prior art speakerphones.

SUMMARY OF THE INVENTION

These and other aspects of the invention may be obtained generally in a voice activity detection scheme that can be used in a half-duplex speakerphone which operates in a transmit mode, a receive mode, and a silence mode. To facilitate smooth and efficient switching between the various modes, the voice activity detection scheme utilizes a novel voice energy term which is derived from an integral of the absolute value of a derivative of a speech signal.

In one embodiment of the present invention, voice activity is detected in a transmit path and a receive path of the speakerphone during the silence mode by comparing a first ratio of a current voice energy value to a background noise value with a voice activity threshold value.

Upon detecting voice activity above the voice activity threshold, the speakerphone transitions from the silence mode to either a transmit or receive mode, depending on the location of the voice activity. A change in direction of the speech signal is identified during the transmit mode or receive mode by comparing a second ratio of a transmit path voice energy value to a receive path voice energy value with a transmit threshold value and a receive threshold value. The voice activity detector initiates the appropriate transition (i.e., change in direction) between the transmit and receive modes according to values of the second ratio with respect to the transmit and receive threshold values.

Following the detection of voice activity in one of the directions, the speakerphone begins transitioning to the applicable mode by gradually suppressing the signal in the other direction. The first ratio for detecting the start of voice activity is used to enable the initial transition from the silence mode to the receive mode or from the silence mode to the transmit mode according to the source of the signal. The second ratio is used to either maintain the speakerphone in its current mode (i.e., the transmit or receive mode) or to begin transitioning towards the other direction (i.e., from the transmit to the receive mode or from the receive to the transmit mode). The transition between the transmit and receive mode is accomplished by gradually suppressing one of the paths (i.e., the transmit or receive path) while gradually removing the suppression from the other path. The gradual application and removal of suppression, when used in conjunction with other aspects of the invention, minimizes the amount of clipping that occurs during the transitions between the various modes of operation.

In another exemplary embodiment, further processor and power savings are achieved by using the steps for detecting the start of voice activity and for detecting the change in direction of the speech signals to control gain insertion and vocoder operations in a half-duplex speakerphone.

Advantageously, valuable processing time is conserved in the voice detection scheme of the present invention because of the efficiencies achieved with the measurement of voice energy using the new voice energy term. Moreover, the voice activity detection scheme of the present invention mitigates the adverse effects of clipping and acoustical coupling by the gradual application and removal of suppression according to ratios of voice energy values.

BRIEF DESCRIPTION OF THE DRAWINGS

A more complete understanding of the present invention may be obtained from consideration of the detailed description of the invention in conjunction with the drawings, with like elements referred to with like references, in which:

FIGS. 4A, 4B, and 4C illustrate the suppression techniques used in the present invention.

DETAILED DESCRIPTION OF THE INVENTION

Although the present invention is particularly well suited for voice activity detection in a half-duplex speakerphone, and shall be described with respect to this application, the voice activity detection method of the present invention can also be applied to many other types of voice activated systems which measure voice energy to determine the presence and direction of speech.

Figure 1:
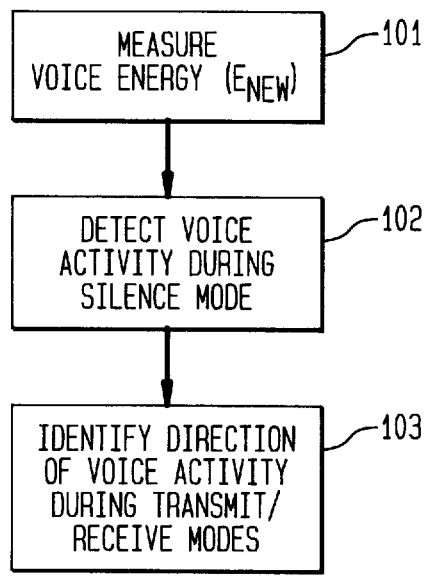
FIG. 1 is a flow diagram of an exemplary embodiment of the method according to the present invention.

As described below in more detail, and in accordance with FIG. 1, an improved voice detection method is used in the half-duplex speakerphone that operates in a transmit mode, a receive mode, and a silence mode. In general, the improved voice detection method includes the step 101 of measuring the voice energy level ($E_{new}$ values) for each frame of sampled data in a speech signal. The method of FIG. 1 further includes the step 102 of detecting voice activity during the silence mode by comparing a first ratio of a current voice energy value to a background noise value with a voice activity threshold value. If the first ratio is greater than the voice activity threshold value, then voice activity is present. Another step 103 involves identifying a direction of the voice activity during the transmit and receive modes by comparing a second ratio of a transmit path voice energy value to a receive path voice energy value with a transmit threshold value and a receive threshold value. If the second ratio is greater than the transmit threshold old value, then voice activity is present in the transmit path. If the second ratio is less than the receive threshold value, then voice activity is present in the receive path.

The present invention achieves savings in both power consumption and processing time by using a novel approach for the measurement of voice energy. Specifically, a new voice energy term is utilized which is based on an integral of the absolute value of a derivative of a signal S(n). Thus, for a digitally sampled voice signal, the voice energy term $E_{new}$ is defined as:

$$E_{new} = \sum_{n=1}^{n=m} |S(n) - S(n-1)|, \quad \text{(Equation 1)}$$

where m represents the total number of samples for a frame of a given duration. For example, in a typical application, a frame may comprise 10 to 30 milliseconds of data.

The voice energy term defined in equation 1 is not as computation intensive as the prior art methods for sampling and squaring the voltage levels of speech signals because the prior art voice energy calculations required the summation of a series of multiplications for each sample in the signal. By contrast, the measurement of voice energy in the present invention consumes less power and processing time than the prior art methods because each sample is compared with the previous sample to determine an energy difference in terms of voltage amplitudes. Thus, only the difference between samples are summed together, which precludes the need for extensive multiplication operations. In addition, measuring voice energy with the new voice energy term offers several other additional advantages over the prior art. For example, as compared with prior art methods, the voice energy term defined in equation 1 is more sensitive to weak fricatives (i.e., speech formations used in generating certain consonants) in a speech signal, especially where background noise is present. As is known to those skilled in the art, fricatives are generally more difficult to detect in a voice activated system because of their lower amplitude levels. As such, the initial portion of a fricative often avoids detection, thus resulting in clipping of some initial portion of the associated speech signal. In the present invention, the differences between successive samples are compared as opposed to multiplying the amplitude of one sample at a time as in the prior art. As a result, the new voice energy measurement used in the present invention can more accurately detect the initial portion of a fricative by focusing on the amplitude variations between samples. Consequently, the fricatives are less susceptible to clipping in the present invention. Similarly, the voice energy term defined in equation 1 is more sensitive to the higher frequency sounds present in the speech signal, which tend to be more difficult to measure because of the greater potential for directional loss as previously described.

Figure 2:
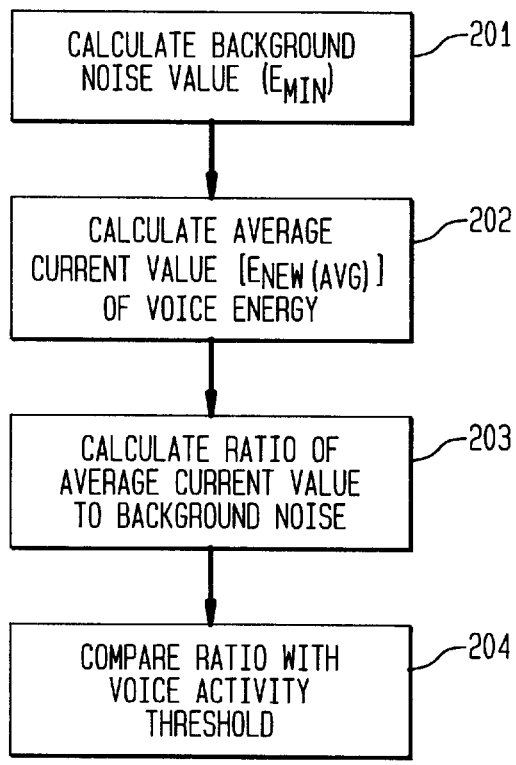
FIG. 2 is a flow diagram which shows the steps for detecting the start of voice activity according to the present invention.

According to the principles of the present invention as shown in FIG. 2, voice activity detection is accomplished by using the voice energy measurements ($E_{new}$ values) for each frame of sampled signals. Specifically, in step 201, a lowest average value of $E_{new}$ is determined from the measured $E_{new}$ values over a previous period of several seconds and is saved as a measure of background noise represented as $E_{min}$. In step 202, the measured $E_{new}$ value from equation 1 is averaged for several frames of sampled speech signals. This value represents an average current value of voice energy $E_{new(avg)}$. A first ratio is calculated in step 203 for the average current value $E_{new(avg)}$ to $E_{min}$ at a frame rate of the sampling system using:

$$\text{Ratio 1} = \frac{E_{new(avg)}}{E_{min}} . \quad \text{(Equation 2)}$$

The first ratio from equation 2 is compared with a given voice activity threshold value in step 204 to detect the start of voice activity. Specifically, voice activity is detected when the value of the first ratio of equation 2 becomes greater than the given voice activity threshold value, which causes the system (e.g., the speakerphone) to enter the transmit or receive mode accordingly. The given voice activity threshold value is pre-determined based on the requirements and parameters of the particular speakerphone. The first ratio from equation 2 for detecting the start of voice activity would be used to determine the presence of speech signals while the speakerphone is in a silence mode. It will be apparent to those skilled in the art that the above steps for detecting the start of voice activity can be used in many other types of voice activated systems as well. Those skilled in the art will also recognize that the steps shown in FIG. 2 can be implemented as part of a computer-controlled software program.

Figure 3:
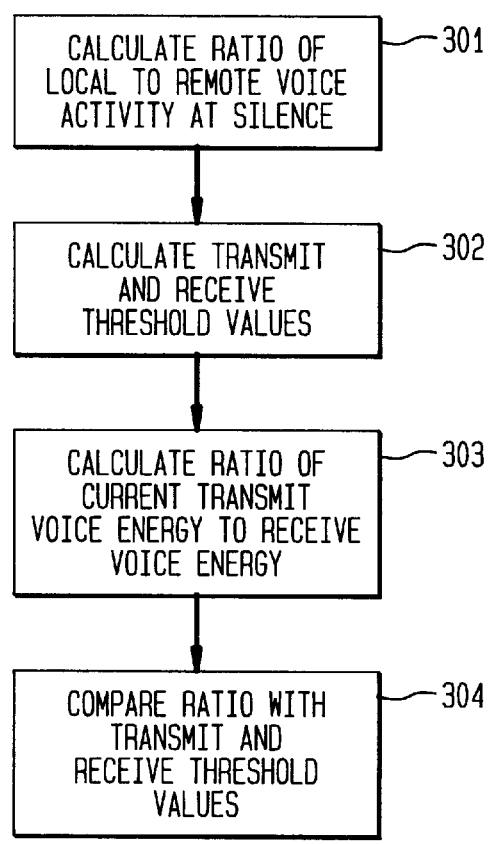
FIG. 3 is a flow diagram which shows the steps for detecting the direction of voice activity according to the present invention.

Once in the transmit or receive mode, the direction of voice activity is detected using remote/local voice activity detection steps shown in FIG. 3. In general, voice activity detected in the transmit path of the speakerphone represents speech originated locally through a microphone of the speakerphone, and voice activity detected in the receive path of the speakerphone represents speech originating remotely from a distant end and received via a speaker in the speakerphone. A scenario may also arise in which both received speech signals and local input speech signals are present, and as such, a need arises to differentiate between feedback signal and normal input signal. A second ratio is used in the present invention to differentiate between these signals as follows:

$$\text{Ratio 2} = \frac{E_{new(mic)}}{E_{new(speaker)}} , \quad \text{(Equation 3)}$$

where $E_{new(mic)}$ and $E_{new(speaker)}$ represent voice energy values measured in the transmit path and the receive path, respectively.

The second ratio from equation 3 is computed during the silence mode in step 301 to determine a level of the background noise in the room combined with any acoustic feedback of the background noise coupled through the speakerphone. A given transmit threshold value and a given receive threshold value are calculated in step 302 based on the value of equation 3. Specifically, the given receive threshold value is assigned to be less than the value of the background noise level calculated in step 301, and is used for detecting speech in the receive path. Similarly a given transmit threshold value is assigned to be greater than the value of the background noise level calculated in step 301, and is used for detecting speech in the transmit path.

While in the transmit or receive mode, the current transmit path voice energy value and a current receive path voice energy value are measured as shown by step 303. The second ratio from equation 3 is calculated based on the measured $E_{new(mic)}$ and $E_{new(speaker)}$ values during the transmit or receive mode to determine whether the speakerphone should remain in the current mode or transition to the other mode. Specifically, when received speech is present (i.e., from the distant end), the value of the second ratio from equation 3 decreases. Conversely, when local speech is present, the second ratio from equation 3 increases. The value of the second ratio from equation 3 is compared to the given transmit and receive threshold values in step 304. If the second ratio from equation 3 is less than the given receive threshold value, the speakerphone is maintained in or switched into the receive mode depending on the current mode at the time.

Similarly, if the value of the second ratio of equation 3 is greater than the given transmit threshold, the speakerphone is maintained in or switched into the transmit mode depending on the current mode at the time.

By way of example only, the given receive threshold value can be set as approximately one-half the value of the background noise level calculated in step 301, while the given transmit threshold value can be set as approximately two times the value of the background noise level calculated in step 301. The given transmit and receive threshold values are also periodically updated during the silence mode in conjunction with the value of the background noise level calculated in step 301, which is updated based on changes to the noise in the room.

In most half-duplex speakerphones, suppression is applied to the speech signals at selected times during the various modes of operation. For example, in the transmit or receive mode, the speech signal in an inactive path (e.g., the transmit path during the receive mode) is completely suppressed while an active path (e.g., the receive path during the receive mode) is open for transmission. Additionally, some level of suppression may be applied during the silence mode to compensate for acoustic coupling of any background noise. An example of an application in which suppression may not be necessary is in a speakerphone having a design that minimizes acoustical feedback, such as in a speakerphone having external speakers and a boom microphone. In most speakerphones, however, some level of suppression must be added to address the acoustic coupling effects.

The technique for detecting the start of voice activity shown in FIG. 2 is used initially to enable an initial transition from the silence mode to the receive mode or from the silence mode to the transmit mode according to the signal source. Remote/local voice activity detection shown in FIG. 3 is used to either maintain the speakerphone in its current mode (i.e., the transmit or receive mode) or to transition to the other direction (i.e., from the transmit mode to the receive mode or from the receive mode to the transmit mode). Following the detection of the remote/local voice activity in one of the directions, the speakerphone begins transitioning to the applicable mode by gradually suppressing the signal in the current direction while gradually removing suppression from the signal in the other direction. More specifically, as the second ratio from equation 3 increases beyond the given transmit threshold value, thus being indicative of local speech being present, more suppression is added to the receive signal so that the speakerphone can enter the transmit mode. Conversely, as the second ratio from equation 3 decreases below the given receive threshold value, thus being indicative of speech being received from the distant end, suppression is gradually removed from the receive path and gradually added to the transmit path so that the speakerphone can enter the receive mode. In either the transmit or receive mode, the corresponding opposite direction is completely suppressed. Again those skilled in the art will realize that the steps of the present invention shown in FIG. 3 and described herein may be implemented in a computer-controlled software program.

FIGS. 4A, 4B, and 4C show the different types of suppression techniques that can be used in conjunction with the present invention for a half-duplex speakerphone. In all scenarios, complete suppression is used for the inactive path during the transmit or receive mode while the active path is completely open for signal transmission. Generally, FIG. 4A shows one suppression technique wherein the noise signals resulting from the acoustic coupling effects in the speakerphone are suppressed during the silence mode at a lower level relative to the complete suppression that occurs during the transmit and receive modes. FIG. 4B shows suppression for a speakerphone in which acoustic coupling is insignificant to the point where suppression is not needed during the silence mode (e.g., the time between the transmit and receive modes). As previously described, this scenario may be useful for configurations having a separate boom microphone and external speakers. As shown in FIG. 4C, complete suppression may be required during the silence mode (e.g., the time between the transmit and receive modes) for speakerphones in which the acoustical coupling is significant.

It should be noted that the representations in FIGS. 4A, 4B, and 4C are time-based representations of the application and removal of suppression according to the steps shown in FIG. 3, and more particularly, according to the value of the second ratio (from equation 3) as compared to the given transmit threshold value 404 and the given receive threshold value 405 (FIGS. 4A, 4B, and 4C). Therefore, suppression is applied and removed accordingly as the value of the second ratio from equation 3 transitions above and below the given transmit threshold value 404 and the given receive threshold value 405.

In more detail, FIG. 4A shows one implementation of suppression for a speakerphone according to the principles of the invention. This suppression implementation would be useful in a speakerphone which has a level of acoustic coupling that is not excessive, but which is sufficient to require some degree of control. By way of example only, a transition from the transmit mode to the receive mode (via the silence mode) is shown. A graduated suppression scale 403 is used to show the amount of suppression that is applied to the transmit path 401 and the receive path 402 as the speakerphone transitions from a full transmit mode to a full receive mode. In the transmit mode, the transmit path 401 is not suppressed (zero suppression on the graduated suppression scale 403) while receive path 402 is completely suppressed (maximum suppression on the graduated suppression scale 403). As the second ratio from equation 3 drops below the transmit threshold value 404 and as voice activity is detected in the receive path 402 using the steps shown in FIG. 3, the speakerphone begins transitioning from a full transmit mode through a silence zone. During this transition, suppression is gradually applied to the transmit path 401 while the complete suppression is gradually removed from the receive path 402.

The gradual suppression used in the present invention is applied and removed according to the graduated suppression scale 403 with pre-determined suppression step intervals that correspond to values of the second ratio from equation 3. For example, complete suppression would correspond to a value of the second ratio (equation 3) above the given transmit threshold value 404 while in the transmit mode. As the speakerphone begins to transition from the transmit mode to the receive mode, the value of the second ratio (equation 3) decreases in value. As the second ratio reaches each of the pre-determined suppression step intervals, gradual suppression is applied or removed accordingly by a certain pre-determined amount. When the second ratio equals a value halfway between the given transmit and receive threshold values, the speakerphone is in silence mode so that the level of suppression (as shown on the suppression scale 403) is at a level which is lower relative to the complete suppression level applied in the transmit mode. As the value of the second ratio continues toward the given receive threshold value 405 (i.e., as the speakerphone enters the receive mode), the transmit path 401 is gradually suppressed to a level of complete suppression while the suppression in the receive path 402 is gradually removed to a level of no suppression. Once the second ratio exceeds the given receive threshold value 405 and the speakerphone is transitioned to a full receive mode, the transmit path 401 is completely suppressed while the receive path 402 is completely open to receive the speech signals from the distant end.

As can be seen in FIG. 4A, there is an overlapping suppression of signals in both the transmit path 401 and the receive path 402 when the speakerphone is in the silence mode (i.e., period of time in between the transmit and receive modes). Because there is a brief period when both the transmit path 401 and receive path 402 are suppressed, there may be some degree of unavoidable clipping of the speech signal in the receive path 402 until the speakerphone fully transitions to the receive mode. However, this clipping is minimized through the use of gradual suppression in conjunction with other aspects of the present invention.

Briefly, FIG. 4B shows the type of suppression that would be appropriate for a speakerphone in which acoustic coupling is not a factor, such as a speakerphone using a separate boom microphone and a set of external speakers. As shown, no suppression is applied while the speakerphone is in the silence mode (e.g., the time between the transmit and receive modes). Using the same example of a transition from the transmit mode to the receive mode, the transition is accomplished in such a way that the complete suppression in the receive path 402 is completely removed before the gradual suppression is gradually applied to the transmit path 401. Accordingly, the absence of any overlapping suppression will prevent the clipping problem which was previously described.

It should be noted that FIG. 4B shows an implementation in which the suppression is gradually removed from the receive path 402 prior to the value of the second ratio dropping below the given transmit threshold value 404. This suppression implementation, as well as those shown in FIGS. 4A and 4C, are only examples of how gradual suppression can be applied and removed in accordance with the predetermined suppression step intervals. The more significant aspect of the suppression implementations of the present invention is the relationship of the application and removal of suppression with the value of the second ratio from equation 3. Therefore, it will be apparent to those skilled in the art that other suppression implementations are possible without departing from the spirit and scope of the present invention.

FIG. 4C shows yet another implementation of suppression using the present invention. In this implementation, the speakerphone has a significant acoustic coupling problem, and as such, complete suppression is applied while the speakerphone is in the silence mode. More specifically, in the example of a transition from the transmit mode to the receive mode, suppression is gradually applied to the transmit path 401 according to the value of the second ratio from equation 3. Once the value of the second ratio from equation 3 drops below the given transmit threshold value 404, the transmit path 401 is completely suppressed. The suppression in the receive path 402 is then gradually removed after the value of the second ratio from equation 3 drops below the receive threshold value 405. Again, the timing of the application and removal of suppression is based on the value of the second ratio from equation 3, and as such, other suitable suppression implementations can be used without departing from the spirit and scope of the present invention. As a result of the overlapping complete suppression (shown in FIG. 4C) during the silence mode (e.g., the time between the transmit and receive modes), this speakerphone would experience clipping of the speech signals before the full transition is accomplished.

In all scenarios, the use of graduated suppression, in conjunction with the steps to detect the presence and direction of voice activity (shown in FIG. 3), facilitates a more controlled transition between modes with a minimal amount of clipping.

A "double talk" scenario (i.e., both local and remote speech present as a result of both parties attempting to talk at the same time) presents a problem for most speakerphones in that the abrupt transition results in clipping. In the present invention, the "double talk" scenario is accommodated much more efficiently by using the second ratio from equation 3 to detect the presence of voice activity in either the transmit or receive path and to implement the appropriate gradual suppression based on this detection. In particular, the second ratio of equation 3 can more readily determine the appropriate direction of voice activity, and as a result, a transition between modes can be implemented much more effectively.

Because the lengthened transmitting and receiving acoustical paths introduce loss in speakerphones, gain is typically added to the transmit and receive paths. However, gain presents additional problems in the prior art speakerphones. Namely, a singing effect results as the acoustic signal picked up by the microphone is fed back to the speaker via sidetone path and returns to the microphone from the speaker via acoustic coupling in the room where the speakerphone is located. Adding too much gain to the transmit and receive paths only exacerbates the singing effect in the speakerphone. Secondly, return of room echoes to the distant end talker can be increased as gain is increased. Automatic gain control (AGC) is typically used for introducing gain into audio systems to control the average amplitude of the signal, and more specifically to boost the signal to a higher level.

In another exemplary embodiment of the present invention, AGC is only applied after voice activity has been detected using either the first or second ratio from equation 2 or 3, respectively. As a result, by using the steps of the present invention for detecting the start of voice activity in combination with AGC, the appropriate level of gain can be added to the signal while not boosting the background noise.

Figure 5:
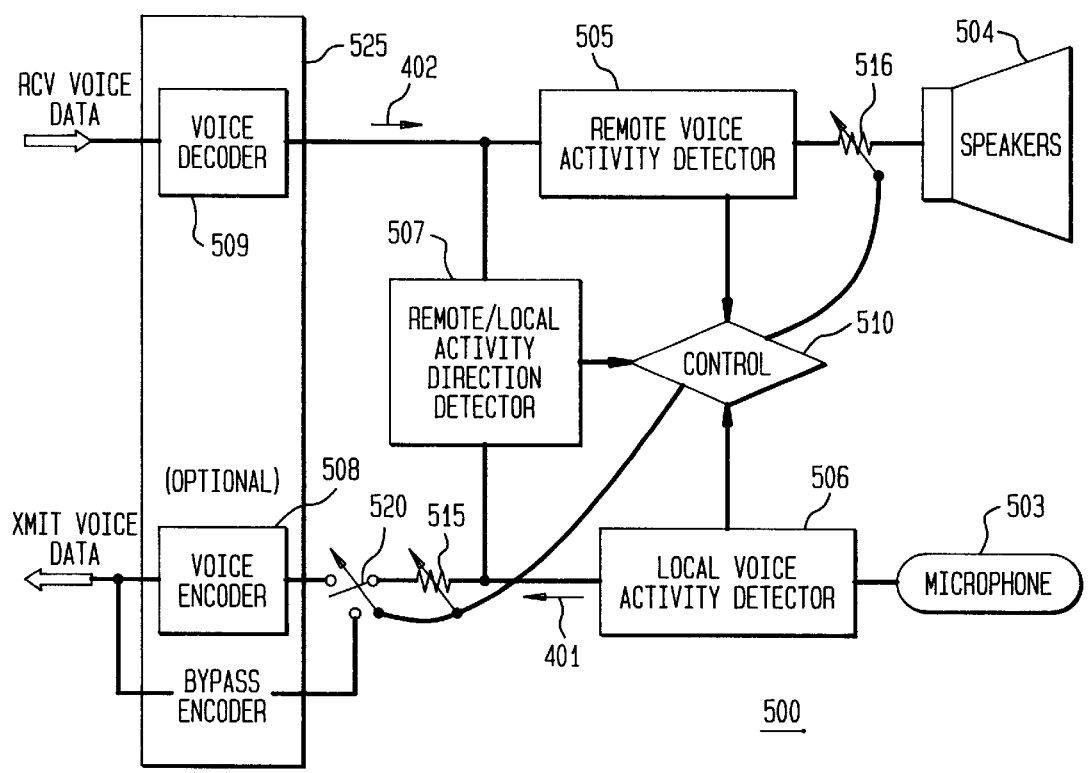
FIG. 5 is a functional system block diagram of a speakerphone according to the present invention.

FIG. 5 shows a functional block diagram of an improved half-duplex speakerphone 500 that uses the improved voice activity detection methods previously described. The speakerphone 500 includes a microphone 503 coupled to the transmit path 401, a speaker 504 coupled to the receive path 402, and a control means 510 that typically includes logic to control the internal state of the speakerphone 500. The speakerphone 500 may also include a vocoder 525 having an encoder section 508 coupled to transmit path 401 and a decoder section 509 coupled to the receive path 402. The voice activity detection steps previously described with respect to FIGS. 1, 2 and 3 are accomplished in speakerphone 500 using a remote voice activity detector 505 for detecting voice activity in the receive path 402, a local voice activity detector 506 for detecting voice activity in the transmit path 401, and a remote/local voice activity direction detector 507 for detecting the change in direction of voice activity between the transmit path 401 and the receive path 402. The speakerphone 500 further includes suppression means 515 and 516 which, by way of example, can be implemented using resistor control. In a practical implementation of the speakerphone 500, the remote voice activity detector 505, the local voice activity detector 506, and the remote/local voice activity direction detector 507 can be implemented as computer-controlled algorithms in a single voice activity detector (not shown).

In operation, the remote voice activity detector 505 detects the start of voice activity in the receive path 402 using the steps shown in FIG. 2 and previously described in detail. The remote voice activity detector 505 provides input to control means 510 upon detecting voice activity in the receive path 402 (e.g., when the first ratio exceeds the given voice activity threshold). The control means 510 is responsive to this input and, in turn, uses logic to control the state of the speakerphone 500 and causes the speakerphone 500 to enter the receive mode. Similarly, the local voice activity detector 506 provides input to control means 510 upon detecting voice activity in the transmit path 401 (e.g., when the first ratio exceeds the given voice activity threshold). The control means 510 is similarly responsive to this input and, in turn, uses logic to control the state of the speakerphone 500 and causes the speakerphone 500 to enter the transmit mode.

While in the transmit or receive mode, the remote/local voice activity direction detector 507 detects the change in direction of voice activity using the steps shown in FIG. 3 and previously described in detail. More specifically, the remote/local voice activity direction detector 507 provides input to control means 510 according to the value of the second ratio as compared with the given transmit and receive threshold values. Upon detecting a change in direction of voice activity, the remote/local voice activity direction detector 507 provides input to the control means 510 so that the speakerphone 500 can be transitioned into the appropriate mode of operation. Control means 510 implements the appropriate suppression by communicating with suppression means 515 and 516 according to the particular suppression implementation previously described and shown in FIGS. 4A, 4B, and 4C.

Referring again to FIG. 5, the vocoder 525 can be used more efficiently in the speakerphone 500 using the steps of the present invention. As is known to those skilled in the art, the encoder and decoder sections, 508 and 509 respectively, are typically maintained in an active state during all modes of operation. However, in one embodiment of the present invention, the encoder section 508 of the vocoder 525 is active in the transmit and silence mode, but is inactive during the receive mode to save power and processing time.

More specifically, the vocoder 525 is used in conjunction with the steps for detecting remote or local voice activity using the second ratio from equation 3. A local voice signal is normally encoded by the encoder section 508 when the speakerphone is in the transmit mode. In the receive mode, only the decoder section 509 of the vocoder needs to be active to decode the incoming signal. Therefore, as the speakerphone transitions from the transmit mode to the receive mode and the second ratio of equation 3 approaches the given receive threshold value, the signal input to the encoder section 508 is gradually suppressed using the suppression means (e.g., resistor control) 515. When the complete transition to the receive mode is accomplished and the second ratio of equation 3 equals (or exceeds) the given receive threshold value, the signal to the encoder section 508 is completely suppressed so that the encoder section 508 can then be bypassed as shown using a switch 520 or other comparable device. While the encoder section 508 is bypassed, the speakerphone 500 saves power and processing time. In order to ensure that the proper state is maintained in the vocoder 525 during the receive mode, a pre-coded silence signal or background noise signal can be transmitted to the remote end. Moreover, if the protocol permits, the pre-coded silence can be represented by a one-bit information transmission, thus conserving additional bandwidth. As the speakerphone 500 transitions back to the silence mode or the transmit mode from the receive mode, the suppression of the signal to the encoder section 508 is gradually removed.

Although the present invention has been described in the context of voice activity detection for speakerphone applications, those skilled in the art may devise other suitable implementations without departing from the spirit and scope of the present invention. For example, the system and method of the present invention may be used in a number of other voice activated systems which measure voice energy to determine the presence and direction of speech and which use the voice energy measurements to transition between operating modes. Accordingly, the present invention should not be limited by the foregoing disclosure, but only by the claims appended hereto.

What is claimed is:

1. A method of operating a speakerphone having a transmit path and a receive path, wherein the speakerphone is operable to process a speech signal in a transmit mode, a receive mode, and a silence mode, the method comprising the steps of:
    measuring a voice energy value of the speech signal by summing amplitude differences between a plurality of samples of the speech signal;
    detecting voice activity in the transmit and receive paths during the silence mode by comparing a first ratio of a current voice energy value to a background noise value with a voice activity threshold value, said first ratio being greater than said voice activity threshold value being indicative of a presence of said voice activity;
    transitioning from the silence mode to an operating mode in response to detecting said presence of said voice activity, wherein said operating mode is selected from the group consisting of the transmit mode and the receive mode;
    identifying a change of direction of said voice activity by comparing a second ratio of a transmit path voice energy value to a receive path voice energy value with a transmit threshold value and a receive threshold value, said second ratio being greater than said transmit threshold value being indicative of said voice activity in the transmit path, and said second ratio being less than said receive threshold value being indicative of said voice activity in the receive path; and
    transitioning between the transmit and receive modes accordingly in response to identifying said change of direction.

2. The method of claim 1, wherein said step of measuring a voice energy value of the speech signal comprises calculating an integral of an absolute value of a derivative of said plurality of samples for a given period.

3. The method of claim 2, wherein said detecting step comprises:
    computing an average voice energy value for a plurality of frames, wherein each of said plurality of frames includes said plurality of samples, and said average voice energy value is representative of said current voice energy value;
    identifying a lowest value of said voice energy values over a given time period, said lowest value being representative of said background noise value;
    assigning said voice activity threshold value; and
    computing said first ratio of said current voice energy value to said background noise value.

4. The method of claim 3, wherein said identifying step comprises:
    assigning said transmit threshold value and said receive threshold value relative to a value of said second ratio during the silence mode;
    computing said average voice energy value for the transmit path to derive said transmit path voice energy value;
    computing said average voice energy value for the receive path to derive said receive path voice energy value; and
    computing said second ratio of said transmit path voice energy value to said receive path voice energy value.

5. The method of claim 4, wherein said step of transitioning from the silence mode to an operating mode comprises entering the transmit mode by gradually suppressing the receive path to a point of complete suppression in response to detecting said voice activity in the transmit path.

6. The method of claim 4, wherein said step of transitioning from the silence mode to an operating mode comprises entering the receive mode by gradually suppressing the transmit path to a point of complete suppression in response to detecting said voice activity in the receive path.

7. The method of claim 4, wherein said step of transitioning between the transmit and receive modes comprises entering the receive mode by gradually removing suppression in the receive path and gradually suppressing the transmit path to a point of complete suppression in response to said second ratio approaching said receive threshold value.

8. The method of claim 4, wherein said step of transitioning between the transmit and receive modes comprises entering the transmit mode by gradually removing suppression in the transmit path and gradually suppressing the receive path to a point of complete suppression in response to said second ratio approaching said transmit threshold value.

9. The method of claim 4, wherein said step of identifying a change of direction further comprises the step of detecting simultaneous voice activity in the transmit path and the receive path.

10. The method of claim 1, further comprising the step of partially suppressing background noise signals in the transmit path and the receive path during the silence mode, wherein said partial suppression in the transmit path overlaps said partial suppression in the receive path.

11. The method of claim 4, wherein said receive threshold value is approximately one-half of said value of said second ratio during the silence mode, and said transmit threshold value is approximately two times said value of said second ratio during the silence mode.

12. The method of claim 4, further comprising the steps of:
    updating said value of said second ratio during the silence mode; and
    computing a new transmit threshold value and a new receive threshold value relative to said updated value of said second ratio.

13. The method of claim 1, further comprising the step of adding gain to the transmit path while in the transmit mode and to the receive path while in the receive mode upon detecting said voice activity in the transmit and receive paths respectively.

14. The method of claim 4, further comprising the step of gradually suppressing an input signal to an encoder section of a vocoder of the speakerphone to a point of complete suppression while entering the receive mode.

15. The method of claim 14, further comprising the step of gradually removing suppression to said encoder section upon a transition from the receive mode to the transmit mode and from the receive mode to the silence mode.

16. The method of claim 14, further comprising the step of transmitting a power-saving signal while in the receive mode.

17. The method of claim 16, wherein said step of transmitting a power-saving signal comprises transmitting a pre-coded silence signal.

18. The method of claim 16, wherein said step of transmitting a power-saving signal comprises transmitting a background noise signal.

19. A speakerphone operable to process a speech signal in a transmit mode, a receive mode, and a silence mode, the speakerphone comprising:

a transmit path;

a receive path; and a voice activity detector coupled to said transmit path and said receive path, said voice activity detector being operable to measure a voice energy value of the speech signal by summing amplitude differences between a plurality of samples of the speech signal, said voice activity detector being operable to detect voice activity in said transmit path and said receive path during the silence mode by comparing a first ratio of a current voice energy value to a background noise value with a voice activity threshold value, said voice activity detector being operable to transition from the silence mode to an operating mode in response to a presence of said voice activity when said first ratio is greater than said voice activity threshold value, wherein said operating mode is selected from the group consisting of the transmit mode and the receive mode, and said voice activity detector being further operable to identify a change of direction of said voice activity by comparing a second ratio of a transmit path voice energy value to a receive path voice energy value with a transmit threshold value and a receive threshold value, said voice activity detector being operable to transition to the transmit mode in response to said second ratio being greater than said transmit threshold value, and said voice activity detector being operable to transition to the receive mode in response to said second ratio being less than said receive threshold value.

20. The speakerphone according to claim 19, wherein said voice activity detector includes:

a local voice activity detector for detecting said voice activity in said transmit path;

a remote voice activity detector for detecting said voice activity in said receive path; and a voice activity direction detector for detecting said change in direction of said voice activity between said transmit path and said receive path.

21. The speakerphone according to claim 20, wherein said voice activity detector is implemented in a computer-controlled software program.

22. The speakerphone according to claim 19, further comprising an automatic gain control means for applying gain to said transmit path while in the transmit mode and to said receive path while in the receive mode, said automatic gain control means communicating with said voice activity detector to insert gain only upon the detection of said voice activity.

23. The speakerphone according to claim 19, wherein said voice activity detector communicates with a vocoder to gradually suppress an input signal to an encoder section of said vocoder to a point of complete suppression while entering the receive mode, said voice activity detector being operable to transmit a power-saving signal while in the receive mode, said voice activity detector being further operable to gradually remove suppression to the encoder section upon a transition from the receive mode.

* * * * *